(12) United States Patent
Titon et al.

(10) Patent No.: US 12,542,723 B2
(45) Date of Patent: Feb. 3, 2026

(54) EFFICIENT SINGLE USER METRIC USAGE FOR HIGH PRECISION SERVICE INCIDENT DETECTION

(71) Applicant: Microsoft Technology Licensing, LLC, Redmond, WA (US)

(72) Inventors: Myriam Titon, Jerusalem (IL); Izhak Mashiah, Qirya Ono (IL); Adir Hudayfi, Eilat (IL); Yosef Asaf Levi, Tel Aviv (IL); Tamar Agmon, Tel Aviv (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/326,610

(22) Filed: May 31, 2023

(65) Prior Publication Data

US 2024/0256418 A1 Aug. 1, 2024

Related U.S. Application Data

(60) Provisional application No. 63/482,250, filed on Jan. 30, 2023.

(51) Int. Cl.
*H04L 41/5061* (2022.01)
*H04L 41/5074* (2022.01)
*H04L 43/02* (2022.01)

(52) U.S. Cl.
CPC .......... *H04L 43/02* (2013.01); *H04L 41/5064* (2013.01); *H04L 41/5074* (2013.01)

(58) Field of Classification Search
None
See application file for complete search history.

(56) References Cited

U.S. PATENT DOCUMENTS

| | | | |
|---|---|---|---|
| 8,949,677 B1 * | 2/2015 | Brundage | G06F 11/0745 714/48 |
| 10,127,125 B2 * | 11/2018 | Krishnan | G06F 11/0751 |
| 10,375,169 B1 | 8/2019 | Diallo et al. | |
| 10,616,251 B2 | 4/2020 | Savalle et al. | |

(Continued)

OTHER PUBLICATIONS

International Search Report and Written Opinion received for PCT Application No. PCT/US24/10378, Apr. 19, 2024, 12 pages.

(Continued)

*Primary Examiner* — Backhean Tiv

(57) ABSTRACT

Systems and methods for service incident detection in a cloud computing platform. According to an example implementation, the incident detection system retrieves a single user metric corresponding to a service call to a resource on which the service is dependent and uses unsupervised anomaly detection to detect anomalies indicative of a service incident. Detected anomalies include an anomaly score indicating a level of anomaly. Additionally, a supervised learning classifier is trained and used to filter/classify the anomaly detection results based on features corresponding to the anomaly score. The features are learned based on characteristic dimensions, distribution, and statistics of anomaly scores of the user metric at different resolution/aggregation levels. Anomaly detection results are classified as an incident or not an incident. A report is generated for a determined incident.

20 Claims, 4 Drawing Sheets

(56) References Cited

U.S. PATENT DOCUMENTS

| | | | |
|---|---|---|---|
| 10,853,161 B2* | 12/2020 | Ahad | G06F 11/3048 |
| 10,917,415 B2* | 2/2021 | Chen | G06N 3/04 |
| 10,928,908 B2 | 2/2021 | Vezzoli | |
| 10,965,541 B2* | 3/2021 | Vijayakumar | H04L 41/147 |
| 11,010,233 B1* | 5/2021 | Golden | G06F 21/554 |
| 11,140,182 B2* | 10/2021 | Ravindranathan | G06N 20/00 |
| 11,204,847 B2* | 12/2021 | Nie | G06N 20/20 |
| 11,263,104 B2* | 3/2022 | Marwah | G06F 11/3006 |
| 11,281,552 B2* | 3/2022 | Joglekar | G06F 11/3037 |
| 11,288,673 B1* | 3/2022 | Venturelli | G06F 18/214 |
| 11,307,570 B2* | 4/2022 | Trinh | G06F 17/18 |
| 11,374,953 B2* | 6/2022 | Givental | G06F 16/55 |
| 11,386,075 B2* | 7/2022 | Schierz | G06Q 10/0635 |
| 11,496,495 B2* | 11/2022 | Babu | G06F 16/285 |
| 11,620,578 B2* | 4/2023 | Ben-Itzhak | G06N 20/00 706/12 |
| 11,698,962 B2* | 7/2023 | Garchery | G06F 21/554 726/23 |
| 11,803,852 B1* | 10/2023 | Henryson | G06Q 20/389 |
| 11,954,216 B1* | 4/2024 | Markle | G06F 21/6218 |
| 2007/0204257 A1* | 8/2007 | Kinno | G06F 21/552 717/100 |
| 2013/0080642 A1* | 3/2013 | Adam | G06F 11/3495 709/226 |
| 2016/0036670 A1* | 2/2016 | Sadovsky | H04L 43/0817 709/224 |
| 2016/0164721 A1* | 6/2016 | Zhang | H04L 41/142 709/224 |
| 2019/0138938 A1* | 5/2019 | Vasseur | G06N 3/088 |
| 2019/0196894 A1* | 6/2019 | Cherbakov | G06F 11/0709 |
| 2020/0201727 A1* | 6/2020 | Nie | G06N 20/00 |
| 2020/0226490 A1* | 7/2020 | Abdulaal | G06N 20/00 |
| 2020/0250477 A1* | 8/2020 | Barthur | G06F 11/0751 |
| 2020/0285737 A1* | 9/2020 | Kraus | G06F 21/552 |
| 2020/0311231 A1* | 10/2020 | Levin | G06F 21/316 |
| 2020/0379454 A1* | 12/2020 | Trinh | G05B 23/024 |
| 2021/0064458 A1* | 3/2021 | Rathinasabapathy | G06F 11/0793 |
| 2021/0126931 A1* | 4/2021 | Babu | G06N 3/044 |
| 2021/0209486 A1* | 7/2021 | Fan | G06N 20/20 |
| 2021/0225500 A1* | 7/2021 | Pronk | H04L 41/069 |
| 2022/0012625 A1* | 1/2022 | Ben-Itzhak | G06N 20/00 |
| 2022/0066906 A1 | 3/2022 | Kumar et al. | |
| 2022/0237102 A1* | 7/2022 | Bugdayci | G06F 11/327 |
| 2022/0385529 A1* | 12/2022 | Dang | H04L 41/142 |
| 2023/0275915 A1* | 8/2023 | Kaul | H04L 63/1425 726/23 |
| 2024/0256418 A1* | 8/2024 | Titon | H04L 41/5064 |

OTHER PUBLICATIONS

Ohana, et al., "Hybrid anomaly detection and prioritization for network logs at cloud scale", Proceedings of The 2021 IEEE/ACM International Conference on Advances in Social Networks Analysis and Mining, Mar. 28, 2022, pp. 236-250.

"Machine Learning", Retrieved From: https://www.datadoghq.com/solutions/machine-learning/, Retrieved On: Feb. 24, 2023, 9 Pages.

"Real-Time Problem & Outage Monitoring", Retrieved From: https://downdetector.com/, Retrieved On: Mar. 26, 2023, 3 Pages.

Gillum, et al., "What are Durable Functions?", Retrieved From: https://learn.microsoft.com/en-us/azure/azure-functions/durable/durable-functions-overview?tabs=csharp-inproc, Mar. 17, 2023, 14 Pages.

Kupervas, Amir, "Why CSPs Need to Shift Focus to Service Experience Monitoring", Retrieved From: https://www.anodot.com/blog/why-csps-need-to-shift-focus-to-service-experience-monitoring/, Retrieved On: Feb. 24, 2023, 5 Pages.

Maxwell, et al., "Application Insights Overview", Retrieved From: https://learn.microsoft.com/en-us/azure/azure-monitor/app/app-insights-overview?tabs=net, Mar. 14, 2023, 6 Pages.

Maxwell, et al., "Application Insights Telemetry Data Model", Retrieved From: https://learn.microsoft.com/en-us/azure/azure-monitor/app/data-model-complete, Mar. 19, 2023, 19 Pages.

Maxwell, et al., "Dependency Tracking in Application Insights", Retrieved From: https://learn.microsoft.com/en-us/azure/azure-monitor/app/asp-net-dependencies, Mar. 14, 2023, 11 Pages.

Neira, et al., "What are Managed identities for Azure Resources?", Retrieved From: https://learn.microsoft.com/en-us/azure/active-directory/managed-identities-azure-resources/overview, Jan. 27, 2023, 4 Pages.

Qamar, et al., "ApplicationInsights-dotnet", Retrieved From: https://github.com/Microsoft/ApplicationInsights-dotnet/blob/39a5ef23d834777eefdd72149de705a016eb06b0/Schema/PublicSchema/ContextTagKeys.bond#/L93, Mar. 2, 2018, 2 Pages.

Richards, et al., "Azure Monitor Overview", Retrieved From: https://learn.microsoft.com/en-us/azure/azure-monitor/overview, Mar. 21, 2023, 13 Pages.

Sagir, et al., "series_decompose_anomalies( )", Retrieved From: https://learn.microsoft.com/en-us/azure/data-explorer/kusto/query/series-decompose-anomaliesfunction, Mar. 12, 2023, 6 Pages.

International Preliminary Report on Patentability (Chapter I) received for PCT Application No. PCT/US2024/010378, Aug. 14, 2025, 6 pages.

* cited by examiner

EFFICIENT SINGLE USER METRIC USAGE FOR HIGH PRECISION SERVICE INCIDENT DETECTION

CROSS-REFERENCE TO RELATED APPLICATIONS

This application claims the benefit of U.S. Provisional Patent Application No. 63/482,250, titled "EFFICIENT SINGLE CUSTOMER METRIC USAGE FOR HIGH PRECISION CLOUD OUTAGES DETECTION," filed Jan. 30, 2023, which is incorporated by reference herein in its entirety.

BACKGROUND

Distributed systems, such as cloud computing systems, are increasingly being applied in various industries. Amongst other benefits, distributed systems offer convenient and on-demand network access to configurable computing resources (e.g., networks, network bandwidth, servers, processing, memory, storage, applications, virtual machines, and services) that can be provisioned and deployed. Users of cloud computing systems may expect such services to be reliable and delivered at an intended or reasonably expected level. Being able to reduce time to detect, understand, and resolve issues with high precision and coverage increases cloud computing system and service reliability.

It is with respect to these and other considerations that examples have been made. In addition, although relatively specific problems have been discussed, it should be understood that the examples should not be limited to solving the specific problems identified in the background.

SUMMARY

Examples described in this disclosure relate to systems and methods for detecting service incidents. According to example implementations, incident detection systems and methods retrieve a single user (e.g., customer) metric corresponding to a service call to a resource on which the service is dependent and use unsupervised anomaly detection to detect anomalies indicative of a service incident. Detected anomalies are assigned an anomaly score indicating a level of anomaly. Additionally, a supervised learning classifier is trained and used to filter and classify the anomaly detection results based on features corresponding to the anomaly score. The features are learned based on characteristic dimensions, distribution, and statistics of anomaly scores of the user metric at different resolution or aggregation levels. Anomaly detection results are classified as a service incident or not a service incident. When an anomaly is determined to be a service incident, the anomaly is reported.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The present disclosure is illustrated by way of example by the accompanying figures, in which like references indicate similar elements. Elements in the figures are illustrated for simplicity and clarity and have not necessarily been drawn to scale.

DETAILED DESCRIPTION

Examples described in this disclosure relate to systems and methods for providing service incident detection. A service, as used herein, refers to software that provides functionality to perform an automated or semi-automated task. A challenge to ensuring a cloud service's reliability is achieving a minimal time-to-detect (TTD) service incidents with high precision and coverage. A service incident refers to an event that negatively impacts a service, such as an outage or a performance degradation associated with accessing or utilizing the service. Traditional approaches typically instrument cloud services with application performance monitors to detect service incidents. Alternatively, aspects of the present disclosure instrument cloud service user logs and metrics (e.g., request duration metrics, success or failure metrics) to detect service incidents. For instance, request duration metrics are recorded and stored in a centralized metrics database when a service performs a service dependency call ("dependency call") to a resource. A service dependency refers to the relationship between a service and a resource, where the service depends on the resource to function properly. A call refers to a request to perform one or more actions. According to examples, a service incident detection system and method uses a single user metric, such as a metric corresponding to a service's dependency calls, to detect—with high precision and minimal TTD—service incidents that impact users (e.g., customers).

Figure 1:
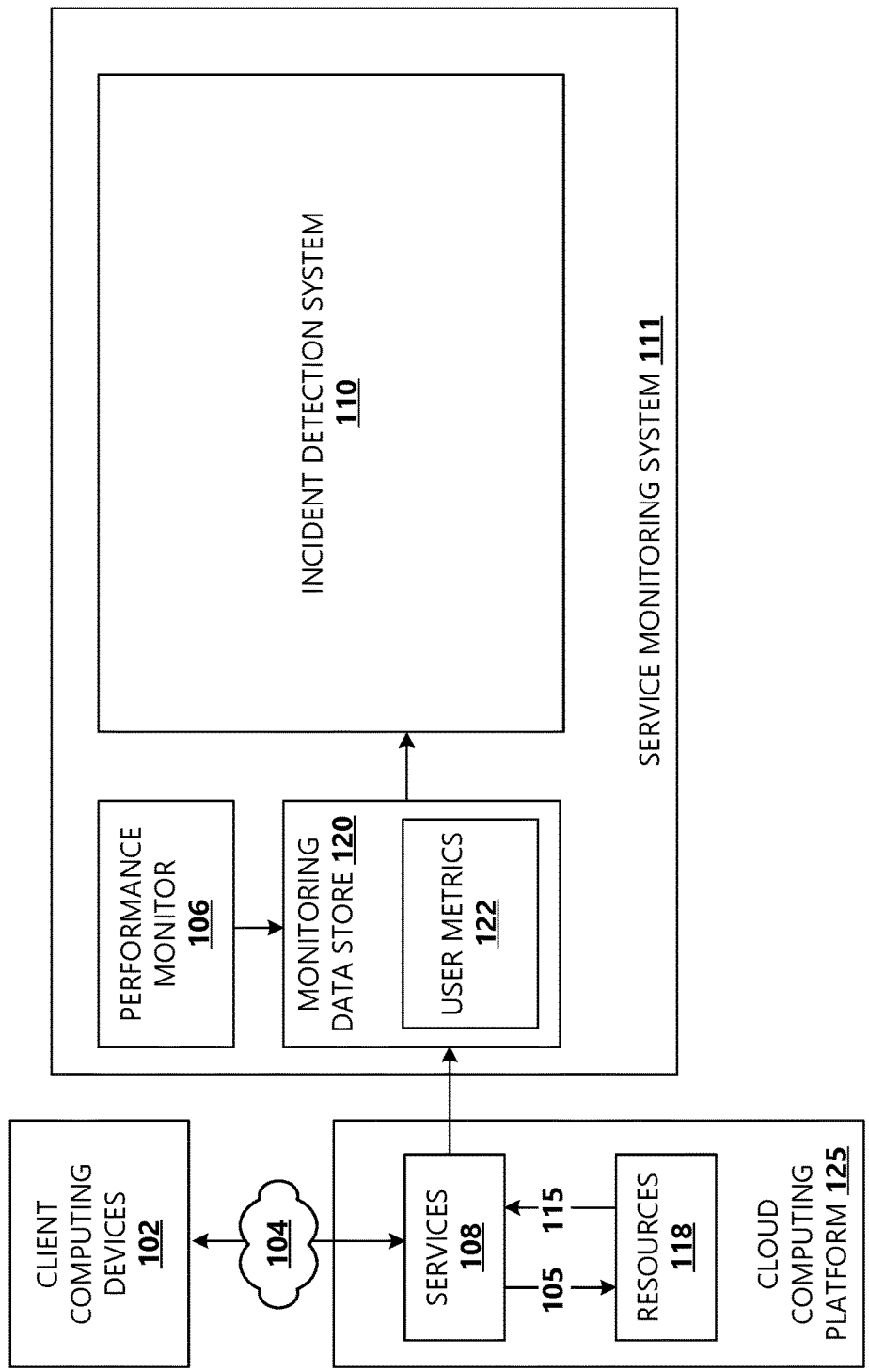
FIG. 1 is a block diagram of a system in which a service incident detection system is implemented according to an example.
Figure 4:
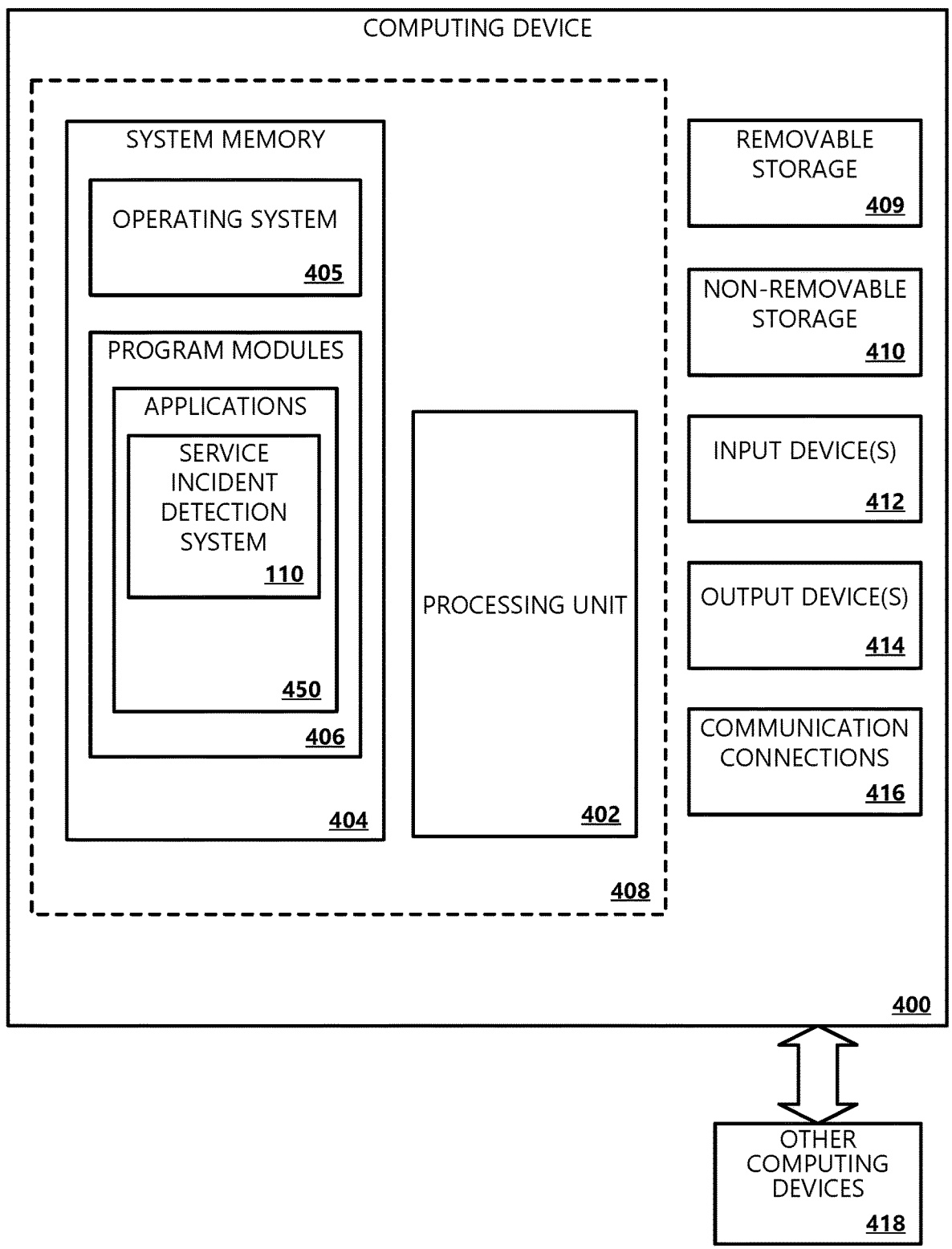
FIG. 4 is a block diagram illustrating example physical components of a computing device with which aspects of the disclosure may be practiced.

FIG. 1 is a block diagram of an example system 100 for implementing service incident detection using a user metric in accordance with an example embodiment. The example system 100 as depicted is a combination of interdependent components that interact to form an integrated whole. Some components of the system 100 are illustrative of software applications, systems, or modules that operate on a computing device or across a plurality of computer devices. Any suitable computer device(s) may be used, including web servers, application servers, network appliances, dedicated computer hardware devices, virtual server devices, personal computers, a system-on-a-chip (SOC), or any combination of these and/or other computing devices known in the art. In one example, components of systems disclosed herein are implemented on a single processing device. The processing device may provide an operating environment for software components to execute and utilize resources or facilities of such a system. An example of processing device(s) comprising such an operating environment is depicted in FIG. 4. In another example, the components of systems disclosed herein are distributed across multiple processing devices.

In FIG. 1, the system 100 includes a cloud computing platform 125 that provides client computing devices 102 with access to applications, files, and/or data provided by various services 108 and supporting resources 118 via one or a combination of networks 104. As depicted, the system 100 further includes a service monitoring system 111 including a performance monitor 106, a monitoring data store 120 and an incident detection system 110. The network(s) 104 include any one or a combination of multiple different types of networks, such as cellular networks, wireless networks, local area networks (LANs), wide area networks (WANs), personal area networks (PANs), or any other type of network configured to communicate information between computing devices and/or systems (e.g., the cloud computing platform 125, the client computing devices 102, and the service monitoring system 111).

Although FIG. 1 is depicted as comprising a particular combination of computing environments, systems, and devices, the scale and structure of systems such as system 100 may vary and may include additional or fewer components than those described in FIG. 1. In one example, one or more services 108, and/or one or more resources 118 are incorporated into one or more client devices 102. In another example, the performance monitor 106, monitoring data store 120, and/or incident detection system 110 operate in the cloud computing platform 125. In another example, system 100 is implemented by a distributed system other than a cloud computing system.

The client devices 102 detect and/or collect input data from one or more users or user devices. In some examples, the input data corresponds to user interaction with one or more software applications or services implemented by, or accessible to, the client devices 102. In other examples, the input data corresponds to automated interaction with the software applications or services, such as the automatic (e.g., non-manual) execution of scripts or sets of commands at scheduled times or in response to predetermined events. The user interaction or automated interaction may be related to the performance of user activity corresponding to a task, a project, a data request, or the like. The input data may include, for example, audio input, touch input, text-based input, gesture input, and/or image input. The input data is detected and/or collected using one or more sensor components of client devices 102. Examples of sensors include microphones, touch-based sensors, geolocation sensors, accelerometers, optical/magnetic sensors, gyroscopes, keyboards, and pointing/selection tools. Examples of client device(s) 102 include personal computers (PCs), mobile devices (e.g., smartphones, tablets, laptops, personal digital assistants (PDAs)), wearable devices (e.g., smart watches, smart eyewear, fitness trackers, smart clothing, body-mounted devices, head-mounted displays), and gaming consoles or devices, and Internet of Things (IoT) devices. In some examples, a client device 102 is associated with a user (e.g., a customer) of the cloud computing platform 125. For instance, a cloud computing platform user may be a person or organization that uses the cloud computing platform 125 to build, deploy, and manage applications and services 108.

The cloud computing platform 125 includes numerous hardware and/or software components and may be subject to one or more distributed computing models and/or services (e.g., infrastructure as a service (IaaS), platform as a service (PaaS), software as a service (SaaS), database as a service (DaaS), security as a service (SECaaS), big data as a service (BDaaS), a monitoring as a service (MaaS), logging as a service (LaaS), internet of things as a service (IOTaaS), identity as a service (IDaaS), analytics as a service (AaaS), function as a service (FaaS), and/or coding as a service (CaaS)). Examples of services 108 include virtual meeting services, topic detection and/or classification services, data domain taxonomy services, expertise assessment services, content detection services, audio signal processing services, word processing services, spreadsheet services, presentation services, document-reader services, social media software or platforms, search engine services, media software or platforms, multimedia player services, content design software or tools, database software or tools, provisioning services, and alert or notification services.

In examples, the resources 118 provide access to various sets of software and/or hardware functionalities that support the services 108. Service dependencies may exist between the services 108 and the resources 118 in the cloud computing platform 125. For example, a service 108 may have a dependency on a resource 118 that is implemented as a database that provides document storage for the service 108. In various implementations, the cloud computing platform 125 includes a microservices architecture, where a service 108 is a self-contained and independently deployable codebase that communicates with other services 108 and resources 118 via a well-defined interface using lightweight Application Programming Interfaces (APIs) to function properly. Example types of resources 118 include artificial intelligence (AI) and machine learning (ML) resources, analytics resources, compute resources, containers resources, database resources, developer tool resources, identity resources, integration resources, Internet of Things (IoT) resources, management and governance resources, media resources, migration resources, mixed reality resources, mobile resources, networking resources, security resources, storage resources, virtual desktop infrastructure resources, and web resources. Other types of services 108 and resources 118 are contemplated and are within the scope of the present disclosure.

In examples, the cloud computing platform 125 is implemented using one or more computing devices, such as server devices (e.g., web servers, file servers, application servers, database servers), edge computing devices (e.g., routers, switches, firewalls, multiplexers), personal computers (PCs), virtual devices, and mobile devices. In other examples, the cloud computing platform 125 is implemented in an on-premises environment (e.g., a home or an office) using such computing devices. In some examples, services 108 and resources 118 are integrated into (e.g., hosted by or installed in) the cloud computing platform 125. Alternatively, one or more service(s) 108 and/or resources 118 are implemented externally to the cloud computing platform 125. For instance, one or more service(s) 108 and/or resources 118 may be implemented in a service environment separate from the cloud computing platform 125 or in client computing device(s) 102.

As illustrated in FIG. 1, the cloud computing platform 125 includes or is communicatively connected to the service monitoring system 111. The performance monitor 106 provides functionality to proactively determine the performance of a service 108 and reactively review service execution data to determine a cause of a service incident. For instance, the performance monitor 106 collects and monitors data (referred to herein as "monitoring data") in the cloud computing platform 125. In some examples, monitoring data includes metrics corresponding to measurements taken over a time period. For instance, metrics include numeric values that are collected at regular intervals (e.g., once every N seconds or minutes), irregular intervals, or responsively to an action from services 108. The metrics describe an aspect (e.g., usage and/or behavior) of the service 108 at a particular time. In some examples, metrics include one or more of the following properties: a metric value, a time when the value was collected, a resource 118 or a service 108 that is associated with the value, a namespace that serves as a category for the metric, a metric name, a metric sampling type (e.g., sum, count, and average), and one or more dimensions.

According to an example implementation, the performance monitor 106 collects and monitors user metrics 122. In an example, user metrics 122 include data representing a call (dependency call 105) from a service 108 to a resource 118. For instance, different users of the cloud computing platform 125 have various uses for their services 108. Thus, the services 108 may have unpredictable dependency usage patterns for the different users. Accordingly, the incident detection system 110 uses a call duration user metric 122 of dependency calls 105 (referred to herein as a dependency call duration) to monitor user-impacting service 108 incidents. For instance, the dependency call duration user metric 122 enables detection of latency issues and various other availability, performance, and reliability issues.

In some examples, the dependency call duration user metric 122 includes a name/value pair, such as "dependency call duration=11 ms", where the dependency call duration is the metric and 11 ms is the value of the metric. Metric dimensions are name/value pairs that carry additional data to describe attributes of a metric. In some examples, dependency metrics include the following dimensions or a combination of the following dimensions: a dependency type dimension including a low cardinality value for logical grouping of dependencies (e.g., SQL, AZURE table, and HTTP); a dependency performance bucket dimension including a set of defined performance buckets; a dependency result code dimension including a result of the dependency call 105 (e.g., a SQL error code or an HTTP status code); a dependency success dimension including an indication of successful or unsuccessful dependency call 105; a dependency target dimension indicating a target resource 118 of the dependency call 105 (e.g., a server name or host address of the resource 118); a cloud role instance dimension including a name of a role associated with the service 108 (e.g., a cloud role name); and a cloud role name dimension including a name of the instance or computer where the service 108 is running.

According to examples, the monitoring data store 120 receives and stores monitoring data for services 108. In some examples, the monitoring data store 120 is optimized for time-series data, where the monitoring data store 120 stores monitoring data as time series and associated dimensions. For instance, time-series data is used to analyze user metrics 122 from a time perspective (e.g., in a linear or non-linear chronological sequence). Thus, in some examples, values of user metrics 122 are transformed into an ordered series of numeric metric values that are stored in the monitoring data store 120. In some examples, user metrics 122 are stored as pre-aggregated time series, which allows for monitoring specific service operations, such as server-resource dependency calls 105. For instance, an example pre-aggregation includes a (dependency call duration)/(dependency target) pre-aggregation including a time series for dependency call durations per target resource 118. In further examples, user metrics 122 include request data generated to log a request received by a service 108, exception data representing an exception that causes an operation to fail, and/or other types of metrics.

Figure 2:
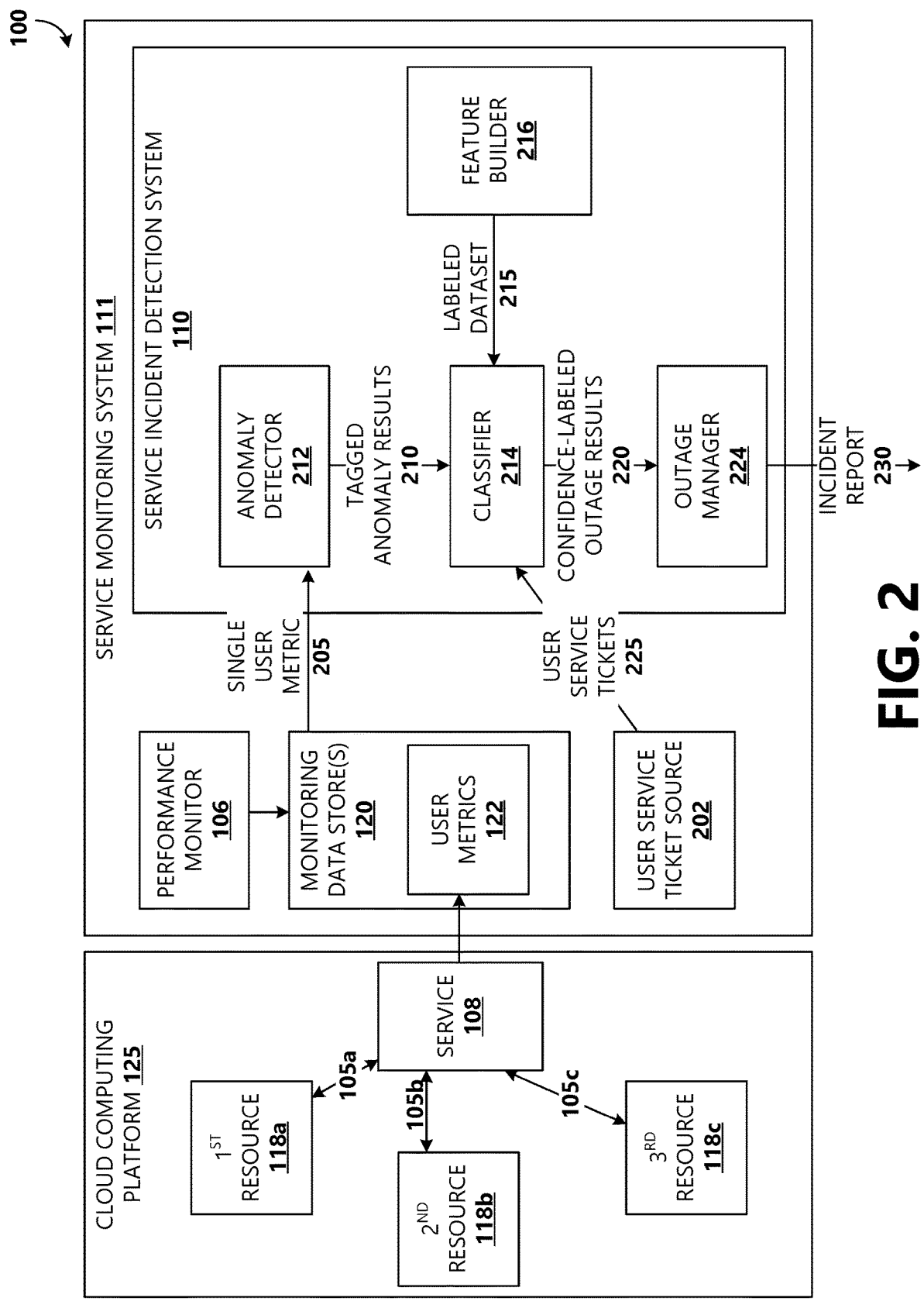
FIG. 2 is a block diagram of an incident detection system and data flow according to an example.

FIG. 2 is a block diagram depicting components of the incident detection system 110 and a data flow for detecting cloud incidents using the incident detection system 110 according to an example implementation. As illustrated in FIG. 2, the incident detection system 110 includes an anomaly detector 212, a classifier 214, a feature builder 216, and an incident manager 224. According to examples, the incident detection system 110 leverages available user metrics 122 to detect service incidents in the cloud computing platform 125. In an example aspect, the anomaly detector 212 retrieves one or more user metrics 122 of interest from the monitoring data store 120. While intuitive approaches may suggest using a combination of a plurality of user metrics 122 to reach high precision for incident detections, a single user metric 122 is used in an example implementation, which is represented in FIG. 2 as single user metric 205. For instance, although a plurality of different user metrics 122 are available to the incident detection system 110, a single user metric 205 corresponding to dependencies of a service 108 is preferably used as the amount of data associated with the plurality of different user metrics 122 would likely be substantial. For such a substantial amount of data, retrieving even a single relevant user metric (i.e., single user metric 205) from all users in the cloud service platform 125 and regions of interest over time consumes vast amounts of computing resources and requires efficient preprocessing logic and the leveraging of pipelines (e.g., aggregating and filtering) to process such an amount of data. As an example, throttling may occur in fetching such large amounts of data from the monitoring data store 120. In some examples, the anomaly detector 112 queries the monitoring data store 120 for a metric pre-aggregation that enables monitoring anomaly durations of specific dependency (resource 118) calls.

The retrieved single user metric 205 pre-aggregation includes a plurality of time-series data sets, where each time-series data set represents the single user metric 205 for a different target resource 118. Pre-aggregations of the single user metric 205 across its dependencies allow for more precise monitoring of performance metrics of the service 108 to identify when dependency calls 105 are taking longer than expected or otherwise indicate an anomaly. An anomaly refers to an event that deviates from an expected or a standard behavior or an event that comprises or is associated with data that deviates from expected or standard data. In examples, an anomaly may or may not be indicative of or correspond to a service event. For instance, a dependency call 105 that takes less time than expected is an anomaly but need not be associated with an outage or a degradation in performance of a service 108. Additionally, retrieving a dependency metric pre-aggregation (e.g., (dependency call duration)/(dependency target)) is faster and requires less compute power than aggregating dimensions of the single user metric 205 at query time.

According to an example implementation, the incident detection system 110 utilizes the anomaly detector 212 to perform unsupervised anomaly detection on the retrieved time-series data sets for the single user metric 205 in a first stage to detect anomalies indicative of a service incident. Additionally, the incident detection system 110 utilizes the classifier 214 to perform supervised learning in a second stage to filter and/or classify the anomaly detection results from the first stage. According to an example implementation, in the first stage, the anomaly detector 212 performs unsupervised anomaly detection on a plurality of time-series data sets, where each time-series data set represents a user's single user metric 205 for a different target resource 118. For instance, the anomaly detector 212 may apply one or more types of algorithms to identify anomalies in the plurality of time-series data sets, such as k-means clustering, local outlier factor (LOF), isolation forest, one-class support vector machines (SVM), etc. In some examples, the anomaly detector 212 calculates an anomaly score for each data point in each time-series dataset representing the anomaly of a data point compared to the other data points in the same dataset.

The anomaly detector 212 further aggregates the number of detected anomalies per time unit. For instance, a new aggregated time series is created including a sequence of data points, where each data point represents the number of anomalies detected during a specific time interval (referred to herein as a time unit) for each target resource 118. In some examples, the time unit is a predetermined time interval (e.g., 1 minutes, 3 minutes, 5 minutes).

In some examples, the anomaly detector 212 performs a second anomaly detection pass on the new aggregated time series and keeps only the anomalies impacting a substantial number of users based on a threshold. In some examples, the anomaly detector 212 uses dynamic thresholds anomaly detection to learn features of the single user metric 205 and determine a threshold for the single user metric 205. If a datapoint corresponding to a time unit's score exceeds the threshold, it is determined as an anomaly. The single user metric 205 is available for each target resource 118, resulting in thousands of time series for the same single user metric 205. Thus, to reduce computational load, the anomaly detector 212 filters each time series based on the threshold, where only determined anomalies are kept from each one of the time series.

In some examples, the sensitivity of anomaly detection is configurable, where higher sensitivity corresponds to more detected anomalies and lower sensitivity corresponds to less detected anomalies. For instance, if the sensitivity is too low, anomalies may be detected only during significant service incidents, and if the sensitivity is too high, anomalies for routine (e.g., non-incident related) service spikes may be detected as service incidents. The threshold value for anomaly detection and the number of users defining a service incident may be predefined and/or configurable, where the threshold value is a compromise between low TTD (to detect service incidents as early as possible) and high precision (to avoid noise). In some examples, the threshold value is dynamically defined according to settings corresponding to percentiles of an anomaly score and different confidence levels. For instance, the anomaly score measures the anomality of each found anomaly. In some examples, the confidence level is calculated for each detection so that different actions can be performed on different confidence levels. As an example, the anomaly score indicates the frequency an anomaly occurs and the severity of the anomaly.

According to an example implementation, the anomaly detector 212 identifies anomalies in a single user metric 205 corresponding to the average duration of dependency calls 105 from a service 108 to a resource 118. As an example, the anomaly detector 212 monitors the duration of all of the service's 108 calls to specific target resources 118, where the service's dependencies include a first service bus resource 118a, a second service bus resource 118b, and a database resource 118c. Thus, the anomaly detector 212 monitors the single user metric 205 associated with: service to first service bus resource calls average call duration, service to second service bus resource calls average call duration, and service to database resource calls average call duration. According to examples, details of all dependency calls 105a-105c (collectively, dependency calls 105) that the service 108 is performing to its resources 118a-118c (collectively, resources 118) are received by the anomaly detector 212 in the single user metric 205. The anomaly detector 212 performs the first and second anomaly detection passes described above to identify abnormalities in the average durations of the dependency calls 105.

According to examples, the anomaly detector 212 tags each detected anomaly (e.g., as abnormal or normal, or problematic or non-problematic) and sends tagged results 210 to the classifier 214 for further analysis. In some examples, the anomaly detector 212 generates and sends an alert indicating when the single user metric 205 (e.g., durations of dependency calls 105 between the service 108 and a resource 118) are abnormal. The alert, for example, is received by the classifier 214, which performs supervised learning on the results 210 tagged as anomalous to filter and/or classify the detected anomalies.

Using an unsupervised method is well adapted to a one-dimensional dependency metric and provides results at a level (e.g., precision, TTD) which may outperform other methods for incident detection of services 108 in the cloud computing platform 125. However, unsupervised learning-based anomaly detection is typically difficult to calibrate and, for this reason, may be inaccurate or noisy, especially for less populated services 108. A remediation tactic includes using additional external signals to improve detection performance. However, aspects of the present disclosure leverage the power of supervised learning to reach high precision and low TTD using a same single user metric 205 for cloud services 108. According to examples, the classifier 214 uses supervised learning to refine classification of the detected anomalies in the tagged results 210 and, as such, enables the incident detection system 110 to reach high precision for service incident detection. According to examples, labeled data is needed to train a supervised model. Due to the difficulty of acquiring labeled data, supervised learning is typically not practicable. For example, manually labeling data is prone to errors, is typically performed on small amounts of data, and relies on user service incident tickets, which may not include relevant information (e.g., consistent tagging of user impact, the number of subscriptions, and impact start and end time from the user perspective).

According to an example implementation, the classifier 214 is a binary classifier that classifies the tagged results 210 of the anomaly detector 212 as true (e.g., a service incident) or false (e.g., not a service incident). For example, the classifier 214 uses service incident data labels included in training data to learn patterns and relationships between a set of features built on the anomaly score determined by the anomaly detector 212 and whether the set of features belong to a service incident classification or a non-service incident classification. In some examples, the classifier 214 is trained on a labeled dataset 215 that includes a set of anomaly score features built by the feature builder 216 and corresponding data labels indicating whether the detected anomaly is a service incident. The classifier 114 learns from the labeled dataset 215 by finding patterns and relationships between the anomaly score features and the data labels (e.g., a service incident or not a service incident). As an example, to classify an anomaly score of a detected anomaly as a service incident or not a service incident, the evaluated features include characteristic dimensions, distribution, and statistics of anomaly scores at different resolution or aggregation levels. Features are described below in further detail with respect to the feature builder 216.

After being trained, the classifier 214 uses learned patterns to process tagged results 210 of the anomaly detector 212 to predict whether a detected anomaly is a service incident. For instance, the classifier 214 generates results by labeling only the anomalies included in the tagged results 210 determined by the unsupervised anomaly detector 212, which significantly reduces the amount of data to label (e.g., in comparison to labeling all time-series corresponding to the retrieved single user metric 205). In other examples, the classifier 214 is a multiclass classifier with more than two classes (e.g., classifications are based on a determined severity level).

In some examples, the classifier 214 further uses semi-automated labeling to label the tagged anomaly detection results 210. In some examples, user service incident tickets 225 are generated by a user service ticket source 202 and provided to the classifier 214, where the tickets 225 communicate a list of services 108 impacted by a service incident. For instance, the classifier 214 uses an automated method to determine whether subscriptions or users associated with the tagged results 210 of the anomaly detector 212 correlate with subscriptions or users associated with incident-impacted services 108 in the communicated tickets 225. The classifier 214 then labels the detected anomalies in the tagged results 210 as true (e.g., a service incident) or false (e.g., not a service incident) based on the determination.

In some examples, for remaining events that are not automatically correlated, the classifier 214 localizes potential correlated user service incident tickets 225 by providing a ranked list (e.g., based on a calculated score) of potentially relevant user service incident tickets 225 based on various ticket features. According to examples, this process is semi-automated (e.g., manual intervention may include selecting an associated user service incident ticket 225 in the ranked list) to match to a detected anomaly, thus requiring minimal manual intervention to enable cloud scale feasibility. In some examples, the classifier 214 determines a score and/or label for each event/time bin detected as anomalous by the anomaly detector 212, where the score and/or label indicates a level of confidence of the service incident determination for the event or time bin. In some examples, an output of the classifier 214 includes the confidence-labeled results 220, which is provided to the incident manager 224. The incident manager 224 creates a report of a service incident 230 based on the classifier's results (i.e., the confidence-labeled results 220). According to examples, high precision service incident detection is achieved using a single user metric 205, while maintaining or reducing TTD.

Incident declaration based on anomalous errors in user telemetry addresses a long-standing gap in automated service incident detection. The incident detection system 110 allows for improved addressing and detection of issues that are user-impacting as the issues are occurring (e.g., in real-time), thus providing improved TTD, precision, and coverage for the detection of user-impacting issues in the cloud computing platform 125.

Additionally, aspects of the incident detection system 110 reduce processing by using a single user metric 205, thus requiring less fetching and throttling overhead and less storage and memory usage. Moreover, using a single user metric 205 allows increasing time resolution, which provides earlier service incident detection. Further, using the duration or latency user metric allows for detecting latency issues, availability issues, and other performance issues. Further still, the incident detection system 110 leverages the power of supervised learning to improve coverage and precision in a cloud environment when large-scale labeling would not have been practicable. Yet further still, coverage and precision are improved using a single user metric 205 by building a variety of features at different granularity levels to learn anomalous behaviors. Methods of the present disclosure can be used for both well-populated (e.g., high numbers of subscriptions or users) applications or metrics and poorly populated (small numbers of subscriptions or noisier) applications or metrics. These methods also can be used for a large variety of resource providers without requiring modifications for specific models.

Figure 3:
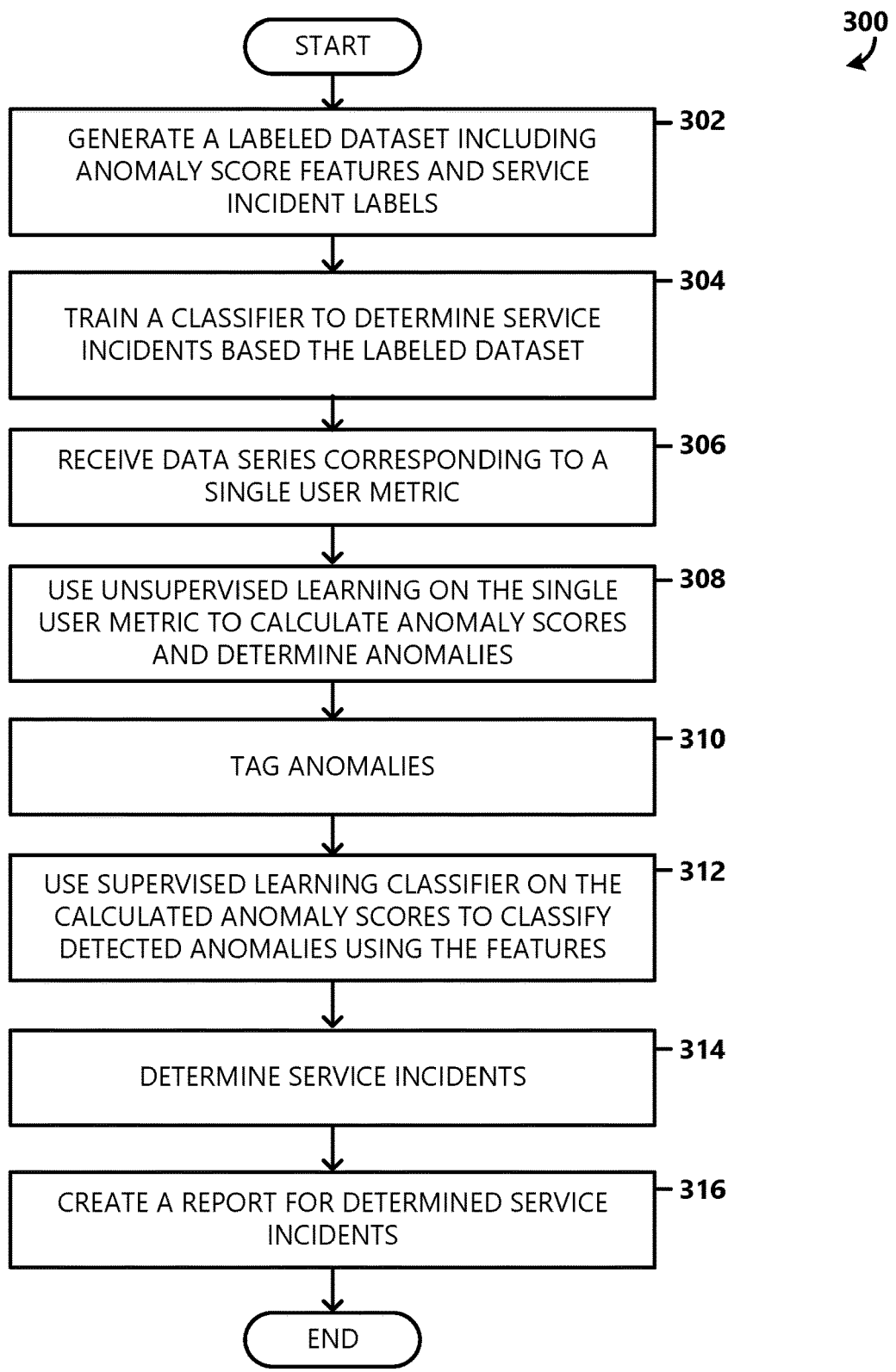
FIG. 3 is a flow diagram depicting an example method of detecting a service incident.

With reference now to FIG. 3, a flowchart depicting a method 300 for detecting service incidents in a cloud computing platform 125 according to an example is provided. The operations of method 300 may be performed by one or more components or computing devices, such as by components of the incident detection system 110. At operation 302, features of anomaly scores of service incidents are defined by the feature builder 216 and included in a labeled dataset 215 for training the classifier 214. Typically, supervised models, such as the classifier 214, are trained on more than one feature to achieve good precision, especially for services 108 that are poorly populated (fewer users or subscriptions) and noisy. To achieve good precision using a single user metric 205, the feature builder 216 builds features of the anomaly score at different resolution levels while learning the different statistical properties of the anomaly score to uncover service incident and anomaly score feature patterns.

In an example implementation, the feature builder 216 uses information relating to one or a combination of the intensity or value of the anomaly score, a previous time bin's anomaly score, and distribution statistics of each anomaly (e.g., each time bin's variance in intensity, variance in time-frequency, number of new alerts, size of new alerts, median intensity). Intensity as used herein refers to the magnitude of a value. Intensity may be measured relative to the other values in a time series such that the seasonality of the time series is taken into account. In some examples, the distribution statistics are defined using multiple levels of resolution or aggregation for each time bin (e.g., per subscription or user and per region). In an example implementation, the feature builder 116 further builds a time series from each feature, where each time series includes sufficient history (e.g., six months) for achieving desired accuracy, generalization, and understanding of the range of anomalies that exist between different examples for the classifier 214. For instance, the time series built by the feature builder 116 include a sufficient number of examples for the classifier 214 to learn from to make more accurate predictions and better generalize to new data. The time series further include diverse data with diverse examples capturing a full range of variation of features of the anomaly score. Further, gross anomaly detection is performed independently for each time series to determine an anomaly score for each feature.

At operation 304, the classifier 114 is trained on the labeled dataset 215 using supervised learning. In some examples, an optimal predicted probability cutoff is selected via automation to optimize false positive and false negative rates and achieve high precision while preserving TTD. The classifier learns from the labeled dataset 115 by finding patterns and relationships between the anomaly score features and data labels to determine whether an anomaly is indicative of a service-level incident.

At operation 306, time-series data corresponding to a single user metric 205 is received. According to an example implementation, the incident detection system 110 retrieves time-series corresponding to durations of dependency calls 105 from a service 108 to its dependencies (e.g., resources 118). The time-series is retrieved from a data store implemented by or accessible to incident detection system 110, such as monitoring data store(s) 120.

At operation 308, anomaly detection is performed on the received single user metric 205. In examples, unsupervised anomaly detection is performed on the time-series data sets, where each time-series data set in the time-series data represents the single user metric 205 for a different target resource 118. The anomaly detector 112 aggregates the number of detected anomalies per time unit into a new aggregated time series on which the anomaly detector 112 further performs a second anomaly detection pass. In some examples, the anomaly detector 112 dynamically sets threshold values (e.g., according to different percentiles of the anomaly score and different confidence levels), where a time bin having an anomaly score that exceeds these thresholds is classified accordingly. In other examples, the threshold values are predefined.

At operation 310, time bins are tagged based on their respective anomaly scores. For example, the anomaly score for each time bin is compared to a threshold value. If the anomaly score for a time bin exceeds the threshold value, the time bin is tagged accordingly. For instance, the time bin may be tagged as anomalous, problematic (e.g., indicative of a service incident), non-anomalous, or unknown (e.g., requires further analysis) based on the anomaly score. In at least one example, each time bin is compared to multiple threshold values of a threshold range. For instance, a threshold range may comprise multiple threshold values. Each time bin may be assigned a tag based on the threshold sub-range in which the corresponding anomaly score is located. As a specific example, a threshold range that spans from zero to ten (0-10) may be arranged such that the threshold sub-range from zero to three (0-3) represents non-anomalous anomaly scores, the threshold sub-range from four to seven (4-7) represents problematic anomaly scores, and the threshold sub-range from eight to ten (8-10) represents anomalous anomaly scores. Each time bin is assigned a tag ("tagged") based on a threshold value associated with the anomaly score for the time bin.

At operation 312, supervised learning is performed on the anomaly scores of the set of tagged anomaly results 210 to filter and/or classify the detected anomalies based on features corresponding to the anomaly score. The features include characteristic dimensions, distribution, and statistics of anomaly scores at different resolution or aggregation levels. For instance, the classifier 114 is trained on a labeled dataset 215, where the labeled dataset 215 includes the set of anomaly score features built by the feature builder 116 and corresponding data labels indicating whether the detected anomaly is a system-level incident.

At operation 314, the classifier 114 classifies the detected anomalies as a service incident or not a service incident based on an identified pattern of characteristic dimensions, distribution, and statistics of anomaly scores of the user metric learned from the labeled dataset 215. In some examples, the classifier 214 further uses semi-automated labeling to label the tagged anomaly results 210. In some examples, user service incident tickets 225 communicating a list of services 108 impacted by service incidents are automatically correlated with subscriptions/users associated with the tagged anomaly results 210. The classifier 214 then labels the detected anomalies as true positives (e.g., a service-level incident) or false positives (e.g., not a service-level incident) based on the determination.

At operation 316, an incident report is created based on determined service-level incidents. For example, if a service incident is detected, the incident detection system 110 generates a report of the service incident, a service ticket, or another form of notification (e.g., an email, a short message service (SMS) message, a phone call). Outage detection system 110 may also determine one or more parties that are to receive the service incident notification. As one example, classifier 114 may classify a first service incident as a low-severity service incident based on a total duration of the service incident or an impact of the service incident on users. Based on the low-severity classification of the service incident, incident detection system 110 may transmit the service incident notification to a first service group (e.g., a Tier 1 support team), whereas higher-severity service incidents are transmitted to other service groups (e.g., a Tier 2 or 3 support team). In at least one example, instead of or in addition to generating the service incident notification, incident detection system 110 automatically performs corrective action to mitigate or resolve the service incident.

FIG. 4 and the associated description provides a discussion of a variety of operating environments in which examples of the disclosure may be practiced. However, the devices and systems illustrated and discussed with respect to FIG. 4 are for purposes of example and illustration, a vast number of computing device configurations that may be utilized for practicing aspects of the disclosure, described herein.

FIG. 4 is a block diagram illustrating physical components (e.g., hardware) of a computing device 400 with which examples of the present disclosure may be practiced. The computing device components described below may be suitable for one or more of the components of the system 100 described above. In a basic configuration, the computing device 400 includes at least one processing unit 402 and a system memory 404. Depending on the configuration and type of computing device 400, the system memory 404 may comprise volatile storage (e.g., random access memory), non-volatile storage (e.g., read-only memory), flash memory, or any combination of such memories. The system memory 404 may include an operating system 405 and one or more program modules 406 suitable for running software applications 450, the incident detection system 110, and other applications.

The operating system 405 may be suitable for controlling the operation of the computing device 400. Furthermore, aspects of the disclosure may be practiced in conjunction with a graphics library, other operating systems, or any other application program and is not limited to any particular application or system. This basic configuration is illustrated in FIG. 4 by those components within a dashed line 408. The computing device 400 may have additional features or functionality. For example, the computing device 400 may also include additional data storage devices (removable and/or non-removable) such as, for example, magnetic disks, optical disks, or tape. Such additional storage is illustrated in FIG. 4 by a removable storage device 409 and a non-removable storage device 410.

As stated above, a number of program modules and data files may be stored in the system memory 404. While executing on the processing unit 402, the program modules 406 may perform processes including one or more of the stages of the method 300 illustrated in FIG. 3. Other program modules that may be used in accordance with examples of the present disclosure and may include applications such as electronic mail and contacts applications, word processing applications, spreadsheet applications, database applications, slide presentation applications, drawing or computer-aided application programs, etc.

Furthermore, examples of the disclosure may be practiced in an electrical circuit comprising discrete electronic elements, packaged or integrated electronic chips containing logic gates, a circuit utilizing a microprocessor, or on a single chip containing electronic elements or microprocessors. For example, examples of the disclosure may be practiced via a system-on-a-chip (SOC) where each or many of the components illustrated in FIG. 4 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to detecting an unstable resource may be operated via application-specific logic integrated with other components of the computing device 400 on the single integrated circuit (chip). Examples of the present disclosure may also be practiced using other technologies capable of performing logical operations such as, for example, AND, OR, and NOT, including mechanical, optical, fluidic, and quantum technologies.

The computing device 400 may also have one or more input device(s) 412 such as a keyboard, a mouse, a pen, a sound input device, a touch input device, a camera, etc. The output device(s) 414 such as a display, speakers, a printer, etc. may also be included. The aforementioned devices are examples and others may be used. The computing device 400 may include one or more communication connections 416 allowing communications with other computing devices 418. Examples of suitable communication connections 416 include RF transmitter, receiver, and/or transceiver circuitry; universal serial bus (USB), parallel, and/or serial ports.

The term computer readable media as used herein includes volatile and nonvolatile, removable and non-removable media implemented in any method or technology for storage of information, such as computer readable instructions, data structures, or program modules. The system memory 404, the removable storage device 409, and the non-removable storage device 410 are all computer readable media examples (e.g., memory storage.) Computer readable media include random access memory (RAM), read-only memory (ROM), electrically erasable programmable ROM (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 400. Any such computer readable media may be part of the computing device 400. Computer readable media does not include a carrier wave or other propagated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, communication media may include wired media such as a wired network or direct-wired connection, and wireless media such as acoustic, RF, infrared, and other wireless media.

In an aspect, a computer-implemented method is provided, comprising: receiving a time-series dataset of a single user metric corresponding to activity of a service; detecting an anomaly in the activity by applying unsupervised learning to the time-series dataset, wherein the anomaly is associated with an anomaly score; identifying features of the anomaly score indicative of a service incident by applying supervised learning to the anomaly score of the anomaly; and classifying the anomaly as the service incident based on the features.

In another aspect, a system is provided, comprising: a processing system; and memory storing instructions that, when executed, cause the system to: detect an anomaly in a time series of a single user metric corresponding to activity of a service by using unsupervised learning on the single user metric, wherein the anomaly is associated with an anomaly score exceeding a first threshold; identify features of the anomaly score that are indicative of a service incident by applying supervised learning to the anomaly score; and classify the anomaly corresponding to the anomaly score as the service incident based on the features.

In another aspect, a computer-readable storage device is provided, the storage device storing instructions that, when executed by a computer, cause the computer to: receive a plurality of time-series datasets of a single user metric corresponding to durations of dependency calls from a service to a plurality of resources; detect anomalies in the plurality of time-series datasets by applying unsupervised learning to the plurality of time-series datasets, wherein the anomalies are associated with anomaly scores; aggregate the anomalies as aggregated anomalies per time unit; when a number of the aggregated anomalies is above a threshold, tag the aggregated anomalies as anomalous; identify features of the anomaly scores by applying supervised learning to the anomaly scores, wherein the features are indicative of a service incident; and classify the aggregated anomalies as the service incident based on the features.

It is to be understood that the methods, modules, and components depicted herein are merely examples. Alternatively, or in addition, the functionality described herein can be performed, at least in part, by one or more hardware logic components. For example, illustrative types of hardware logic components that can be used include Field-Programmable Gate Arrays (FPGAs), Application-Specific Integrated Circuits (ASICs), Application-Specific Standard Products (ASSPs), System-on-a-Chip systems (SOCs), Complex Programmable Logic Devices (CPLDs), etc. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or inter-medial components. Likewise, any two components so associated can also be viewed as being "operably connected," or "coupled," to each other to achieve the desired functionality. Merely because a component, which may be an apparatus, a structure, a system, or any other implementation of a functionality, is described herein as being coupled to another component does not mean that the components are necessarily separate components. As an example, a component A described as being coupled to another component B may be a sub-component of the component B, the component B may be a sub-component of the component A, or components A and B may be a combined sub-component of another component C.

The functionality associated with some examples described in this disclosure can also include instructions stored in a non-transitory media. The term "non-transitory media" as used herein refers to any media storing data and/or instructions that cause a machine to operate in a specific manner. Illustrative non-transitory media include non-volatile media and/or volatile media. Non-volatile media include, for example, a hard disk, a solid-state drive, a magnetic disk or tape, an optical disk or tape, a flash memory, an EPROM, NVRAM, PRAM, or other such media, or networked versions of such media. Volatile media include, for example, dynamic memory such as DRAM, SRAM, a cache, or other such media. Non-transitory media is distinct from, but can be used in conjunction with transmission media. Transmission media is used for transferring data and/or instruction to or from a machine. Examples of transmission media include coaxial cables, fiber-optic cables, copper wires, and wireless media, such as radio waves.

Furthermore, those skilled in the art will recognize that boundaries between the functionality of the above-described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the disclosure provides specific examples, various modifications and changes can be made without departing from the scope of the disclosure as set forth in the claims below. Accordingly, the specification and figures are to be regarded in an illustrative rather than a restrictive sense, and all such modifications are intended to be included within the scope of the present disclosure. Any benefits, advantages, or solutions to problems that are described herein with regard to a specific example are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A computer-implemented method, comprising:
   receiving, at an incident detection system, a time-series dataset of a single user metric corresponding to activity of a service, wherein the time-series dataset comprises measurements representing durations of dependency calls from the service to a resource that the service depends on, and wherein the single user metric comprises at least one of:
      a dependency type dimension including a low cardinality value for logical grouping of dependencies; or
      a dependency success dimension indicating whether one or more dependency calls were successful;
   detecting an anomaly in the activity by applying, by an anomaly detector of the incident detection system, unsupervised learning to the time-series dataset, wherein the anomaly is associated with an anomaly score indicating that a duration of a dependency call from the service to the resource exceeds a threshold value;
   identifying, by the anomaly detector, features of the anomaly score at multiple different resolution levels, wherein the features are indicative of a service incident by applying supervised learning to the anomaly score of the anomaly;
   classifying, by a classifier of the incident detection system, the anomaly as the service incident based on the features, wherein the classifier is trained using a set of anomaly score features; and
   performing a corrective action to mitigate or resolve the service incident.

2. The computer-implemented method of claim 1, wherein identifying the features of the anomaly score indicative of the service incident comprises identifying a pattern of a feature associated with the service incident learned from supervised learning of a labeled dataset including a plurality of historical time-series corresponding to features of a plurality of historical anomaly scores of the single user metric of known service incidents.

3. The computer-implemented method of claim 2, further comprising building the features of the anomaly score using at least one of:
   characteristic dimensions of the plurality of historical anomaly scores;
   distribution of the plurality of historical anomaly scores; or
   statistics of the plurality of historical anomaly scores.

4. The computer-implemented method of claim 1, wherein detecting the anomaly in the activity comprises:
   calculating a respective anomaly score for each data point in the time-series dataset; and
   determining the data point is anomalous based on the anomaly score being above a first threshold.

5. The computer-implemented method of claim 4, further comprising dynamically setting the first threshold.

6. The computer-implemented method of claim 4, further comprising:
   aggregating a number of detected anomalies per time unit; and
   tagging corresponding detected anomalies as anomalous based on the number of detected anomalies being above a second threshold.

7. The computer-implemented method of claim 6, further comprising dynamically setting the second threshold.

8. The computer-implemented method of claim 1, further comprising:
   receiving a plurality of user service incident tickets reporting service incidents of users; and
   classifying the anomaly as the service incident based on a determined correlation between a user associated with the single user metric and a user associated with the service incident included in the plurality of user service incident tickets.

9. The computer-implemented method of claim 1, further comprising generating a report for the service incident.

10. A system comprising:
    a processing system; and
    memory storing instructions that, when executed, cause the system to:
       detect an anomaly in a time-series of a single user metric corresponding to activity of a service by using unsupervised learning on the single user metric, wherein the time-series dataset comprises measurements representing durations of dependency calls from the service to a resource that the service depends on, wherein the anomaly is associated with an anomaly score indicating that a duration of a dependency call from the service to the resource exceeds a first threshold, and wherein the single user metric comprises at least one of:
- a dependency type dimension including a low cardinality value for logical grouping of dependencies; or
- a dependency success dimension indicating whether one or more dependency calls were successful;

identify features of the anomaly score at multiple different resolution levels, wherein the features are indicative of a service incident by applying supervised learning to the anomaly score;

classify the anomaly corresponding to the anomaly score as the service incident based on the features;

generate an indication of the service incident; and provide the indication of the service incident to a resolution entity for mitigation or resolution of the serviced incident.

11. The system of claim 10, wherein the features of the anomaly includes patterns of features associated with the service incident learned from supervised learning of a labeled dataset including a plurality of historical time-series corresponding to features of a plurality of historical anomaly scores of the single user metric of known service incidents.

12. The system of claim 11, wherein the instructions further cause the system to build the features of the anomaly score using at least one of:
- characteristic dimensions of the plurality of historical anomaly scores;
- distribution of the plurality of historical anomaly scores; or
- statistics of the plurality of historical anomaly scores.

13. The system of claim 10, wherein the indication of the service incident is an incident report for the service incident.

14. The system of claim 10, wherein detecting anomalies in the time series of the single user metric, comprises:
- calculating a respective anomaly score for each data point in the time series; and
- determining the data point is anomalous based on the anomaly score being above the first threshold;
- aggregating a number of detected anomalies per time unit; and
- tagging corresponding detected anomalies as anomalous based on the number of detected anomalies being above a second threshold.

15. The system of claim 14, wherein the first threshold is dynamically set.

16. The system of claim 10, wherein the instructions further cause the system to:
- receive a plurality of user service incident tickets reporting service incidents of users; and
- classify the anomaly as the service incident based on a determined correlation between a user associated with the single user metric and a user associated with one or more service incidents included in the plurality of user service incident tickets.

17. A computer-readable storage device storing instructions that, when executed by a computer, cause the computer to:
receive a plurality of time-series datasets of a single user metric corresponding to durations of dependency calls from a service to a plurality of resources that the service depends on, and wherein the single user metric comprises at least one of:
- a dependency type dimension including a low cardinality value for logical grouping of dependencies; or
- a dependency success dimension indicating whether one or more dependency calls were successful;

detect anomalies in the plurality of time-series datasets by applying unsupervised learning to the plurality of time-series datasets, wherein the anomalies are associated with anomaly scores indicating that a duration of a dependency call from the service to the resource exceeds a threshold value;

aggregate the anomalies as aggregated anomalies per time unit;

when a number of the aggregated anomalies is above a threshold, tag the aggregated anomalies as anomalous;

identify features of the anomaly scores at multiple different resolution levels by applying supervised learning to the anomaly scores, wherein the features are indicative of a service incident;

classify the aggregated anomalies as the service incident based on the features;

determine whether the service incident is low-severity or high-severity based on at least one of:
- a duration of the service incident; or
- an impact of the service incident on users; and transmit an indication of the service incident to a resolution entity for mitigation or resolution of the serviced incident, wherein the indication of the service incident is provided to a first resolution entity if the service incident is determined to be low-severity and the service incident is provided to a second resolution entity if the service incident is determined to be high-severity.

18. The computer-readable storage device of claim 17, wherein the single user metric further comprises a dependency performance bucket dimension including a set of defined performance buckets.

19. The computer-readable storage device of claim 17, wherein the single user metric further comprises a dependency result code dimension including a result code of the dependency call.

20. The computer-readable storage device of claim 17, wherein the single user metric further comprises a dependency target dimension indicating a target resource of the dependency call.

* * * * *